June 3, 1924.  1,496,685

J. J. SWEENEY

SHOCK ABSORBER

Filed June 26, 1920  2 Sheets-Sheet 1

J. J. Sweeney INVENTOR

BY Victor J. Evans ATTORNEY

WITNESSES

June 3, 1924.

J. J. SWEENEY

SHOCK ABSORBER

Filed June 26, 1920

J. J. Sweeney  INVENTOR

BY Victor J. Evans  ATTORNEY

WITNESSES

Patented June 3, 1924.

1,496,685

UNITED STATES PATENT OFFICE.

JOHN J. SWEENEY, OF DORCHESTER, MASSACHUSETTS.

SHOCK ABSORBER.

Application filed June 26, 1920. Serial No. 391,880.

*To all whom it may concern:*

Be it known that I, JOHN J. SWEENEY, a citizen of the United States, residing at Dorchester, in the county of Suffolk and State of Massachusetts, have invented new and useful Improvements in Shock Absorbers, of which the following is a specification.

This invention comprehends the provision of a shock absorber for vehicles and wherein the body spring is suspended by a novel construction and arrangement of parts which absorb the shock and jars of the running gear incident to the travel of the machine over irregular surfaces, thus preventing these shocks and jars from being transmitted to the body of the vehicle.

More specifically stated, the invention embodies amongst other features a lever having one end pivotally connected with the adjacent extremity of the body spring, and its opposite terminal overlying the spring and associated with a coiled spring carried by the body spring, the movements of the lever being confined and controlled by means of stops thereon and links which have their corresponding extremities pivotally associated with the lever at an intermediate point in its length, the opposite ends of the links being pivotally connected with the usual perch with which the vehicle axle is equipped for connection with the body spring.

One object of the invention is the provision on the lever of improved means for limiting or stopping movement of the lever relative to the body spring and vice versa.

Another object of the invention resides in providing the lever with lateral extensions which are opposed to the outer edges of the links and which are brought in contact with the links to check the side movement of a body connected with the body spring.

In carrying out the invention I further provide a lever with a lip disposed to come in contact with the underside of the body spring, thus combating the radial movement of the lever and preventing the same from becoming casually separated from the coil spring above mentioned.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein.

Figure 1:
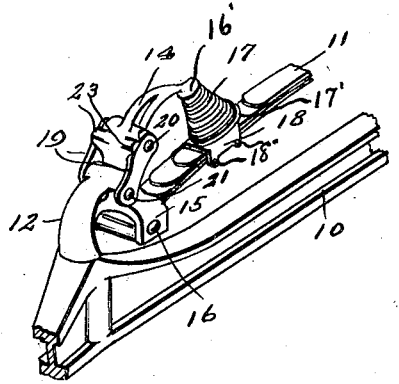
Figure 1 is a perspective view of one of the shock absorbing devices showing its association with the front axle of a vehicle and the body spring thereof.
Figure 2:
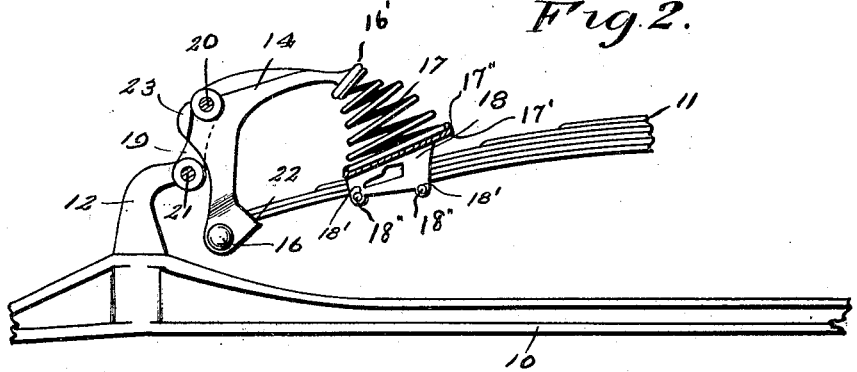
Figure 2 is an enlarged vertical sectional view.
Figure 3:
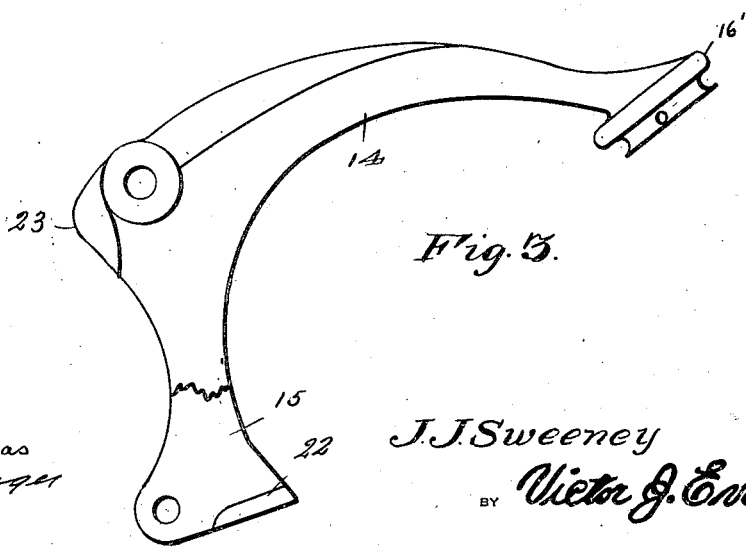
Figure 3 is a detail view of the body spring suspension lever.
Figure 4:
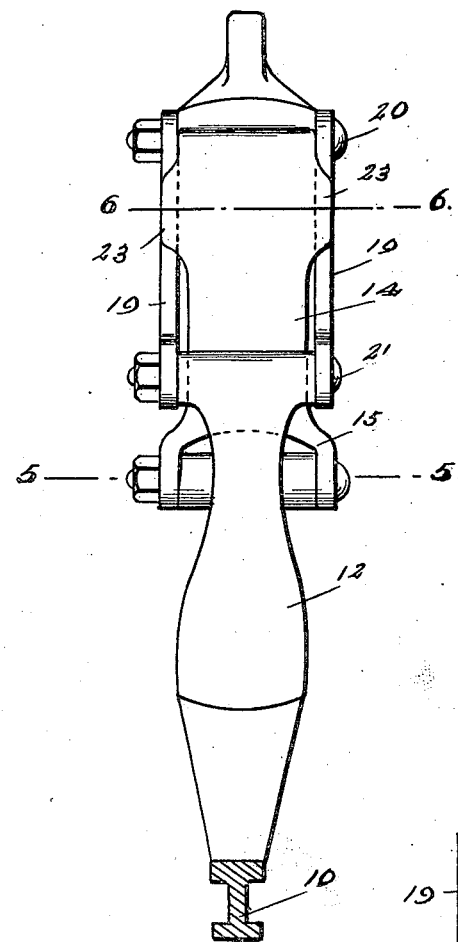
Figure 4 is an edge elevation.
Figure 5:
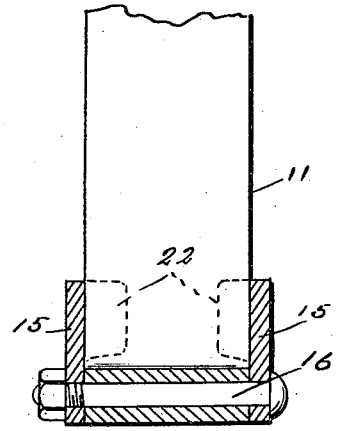
Figure 5 is a sectional view taken on line 5—5 of Figure 4.
Figure 6:
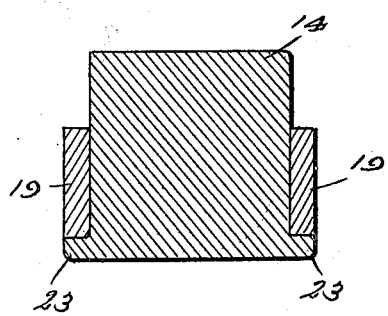
Figure 6 is a detail sectional view of the lever taken on the line 6—6 of Figure 4.

Referring to the drawings in detail, 10 indicates the front axle of a motor vehicle, 11 the body supporting spring, and 12 the bracket perch of usual construction with which the adjacent end of the spring 11 is generally connected.

The shock absorber forming the subject matter of my invention embodies a body spring suspension lever 14 which is curved longitudinally, and has one end bifurcated as at 15 for the reception of the adjacent end of the spring 11. The lever and spring are pivotally connected together as at 16. The opposite end of the lever overlies the body spring and is provided with a circular head 16' which is connected with the adjacent end of a coiled spring 17 which is interposed between the lever 14 and the body spring 11, this spring being secured to the spring 11 by a circular plate 17' provided with a peripheral flange 17'' which is secured to a U-shaped clamp 18 provided with aligned openings 18' which receive a plurality of bolts 18'' engaging the lower side of the body spring 11. Links 19 have their corresponding extremities pivotally connected with the bracket 12, these links being arranged at the opposite sides of the lever 14 and have their opposite ends pivotally connected with the lever as at 20. Manifestly, the links 19 are utilized as fundamental working parts of the shock absorber, these links by changing their position from the pivotal point 21 govern the arc of movement of the pivotal point 16. The change in the position of the pivotal point 20 increases the flexibility of the invention and enables the shock absorber to carry a heavier load than it would otherwise support, and at the same time properly function for the purpose intended. The side shocks are taken up primarily by the coil spring 17, and materially assisted by the tendency of the links 19 to assume a vertical position. The movement of the lever in a radial path from the pivot point 21 is limited by means of the lip 22 formed on the terminal of said lever and disposed to be brought into contact with the body spring 11, which fact prohibits the lever from being casually separated from the spiral or coil spring 17. The lever 14 is further formed to provide lateral extensions 23 which are disposed outwardly beyond the links 19 and when the extensions are brought into contact with said links they check the side movements of the car body as will be readily understood.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim is:—

1. In a vehicle, the combination of an axle provided with a perch, a body spring disposed above the axle, a swinging support on the perch, a lever pivotally connected at an intermediate point in its length to said swinging means and having one of its arms pivotally connected with one end of the body spring and also having on said arm and outwardly beyond the swinging means a stop to cooperate with the swinging means in limiting movement of the lever about its center in one direction, and a cushion interposed and secured between the other arm of the lever and the body spring at an intermediate point in the length of the latter.

2. In a vehicle, the combination of an axle provided with a perch, a body spring disposed above the axle, a swinging support on the perch, a lever pivotally connected at an intermediate point in its length to said swinging means and having one of its arms pivotally connected with one end of the body spring and also having on said arm and outwardly beyond the swinging means a stop to cooperate with the swinging means in limiting movement of the lever about its center in one direction, and a cushion interposed and secured between the other arm of the lever and the body spring at an intermediate point in the length of the latter; the said lever being also provided below the body spring with a lip to bring up against said body spring.

In testimony whereof I affix my signature.

JOHN J. SWEENEY.